(12) United States Patent
Lin

(10) Patent No.: US 6,493,475 B1
(45) Date of Patent: Dec. 10, 2002

(54) MONOLITHIC INTEGRATION OF SIGNAL-MONITORING SCHEME IN AN OPTICAL SWITCH

(75) Inventor: Lih Y. Lin, Little Silver, NJ (US)

(73) Assignee: Tellium, Inc., Oceanport, NJ (US)

( * ) Notice: Subject to any disclaimer, the term of this patent is extended or adjusted under 35 U.S.C. 154(b) by 54 days.

(21) Appl. No.: 09/691,225

(22) Filed: Oct. 19, 2000

(51) Int. Cl.⁷ .............................. G02B 6/12; G02B 6/30; G02B 6/36
(52) U.S. Cl. .............................. 385/14; 385/33; 385/49; 385/88; 385/89
(58) Field of Search .................... 385/14, 88–94, 385/33, 49

(56) References Cited

U.S. PATENT DOCUMENTS

| | | | | |
|---|---|---|---|---|
| 5,159,586 A | * | 10/1992 | Yamahita et al. | 369/44.11 |
| 5,198,684 A | * | 3/1993 | Sudo | 257/79 |
| 5,644,667 A | * | 7/1997 | Tabuchi | 385/49 |
| 5,787,215 A | * | 7/1998 | Kuhara et al. | 385/88 |

* cited by examiner

*Primary Examiner*—Brian Healy
*Assistant Examiner*—Kevin S Wood
(74) *Attorney, Agent, or Firm*—Morgan, Lewis & Bockius LLP

(57) ABSTRACT

An integrated device includes a micro-lens and an opto-electronic device can be formed on a single substrate. The opto-electronic device may be one or more photodetectors and the micro-lens may be shaped to allow partial absorption of light incident to the micro-lens by the photodetectors. The integrated device is capable of simultaneously performing position detection, signal monitoring, and focusing/collimation.

23 Claims, 5 Drawing Sheets

MONOLITHIC INTEGRATION OF SIGNAL-MONITORING SCHEME IN AN OPTICAL SWITCH

RELATED APPLICATIONS

This application is related in subject matter to U.S. application Ser. No. 09/691,193, filed concurrently herewith and expressly incorporated by reference herein.

BACKGROUND OF THE INVENTION

1. Field of the Invention

The present invention relates to the monolithic integration of opto-electronic components and optical components and, more particularly, the monolithic integration of a photodetector and an optical micro-lens for signal-monitoring in an optical switch.

2. Description of the Related Art

Increasing demands for high-speed Internet service and wireless communications are soon expected to outstrip current telecommunications capacity. Telecommunications carriers are turning to optical fiber networks in an effort to meet future needs. Optical fiber networks are capable of transmitting huge volumes of data at blinding speeds.

In order to implement tomorrow's optical fiber networks, the telecommunications industry is looking for new optical systems that are inexpensive, energy efficient, and that may be efficiently scaled for use with a growing number of optical signals. Currently, optical systems often include optical lenses, which are used to refract or diffract light beams. Optical lenses may be used for a variety of purposes, including to focus light onto the core of an optical fiber so that the light may be transmitted through the optical fiber. It is important to focus as much of the light as possible onto the optical fiber core to reduce losses.

Optical systems also use a variety of opto-electronic devices. Examples of opto-electronic devices include lasers, light emitting diodes (LEDs), and photodetectors. Each of these devices may be built from semiconductor materials. Lasers and light-emitting diodes generate light. The generated light may be used in a number of ways. Photodetectors are devices used to detect light for a variety of purposes. The detected light is converted into electrical signals. In some applications, photodetectors may be used for control purposes, e.g., to detect the presence or absence of a light beam, the signal quality, and/or the strength or intensity of the light beam. For example, photodetectors may be used to detect the presence or position of a light beam to ensure the proper alignment of two components. Photodetectors may also be used to detect the intensity of a light beam.

Lenses and photodetectors are typically built separately. In a conventional arrangement for detecting a light beam and directing a light beam onto an optical fiber, the light beam must be split into two paths. One path is directed to the photodetector, which detects the light beam. The other path is directed to a lens, which focuses the light beam onto the optical fiber. This arrangement suffers from several problems. Among other deficiencies, the arrangement occupies a relatively large area and requires precise alignment of the individual components. Any disturbance can misalign the components, impairing operation.

SUMMARY OF THE INVENTION

The present invention has been made in view of the above circumstances and has as an object to provide an integrated arrangement of an opto-electronic component, a beam-splitter, and an optical lens.

It is a further object of the invention to provide an inexpensive optical device combining an opto-electronic component, a beam-splitter, and an optical lens.

It is a further object of the invention to provide a compact arrangement of a photodetector, a beam-splitter, and an optical lens.

It is a further object of the invention to provide a simple method of forming an integrated device combining an opto-electronic component, a beam-splitter, and an optical lens.

It is a further object of the invention to provide a method of using an integrated device combining an opto-electronic component, a beam-splitter, and an optical lens.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiment(s) of the invention and together with the description, serve to explain the principles of the invention.

DESCRIPTION OF THE PREFERRED EMBODIMENT

Reference will now be made in detail to the present exemplary embodiment(s) of the invention illustrated in the accompanying drawings. Wherever possible, the same reference numbers will be used throughout the drawings to refer to the same or like parts.

Figure 1:
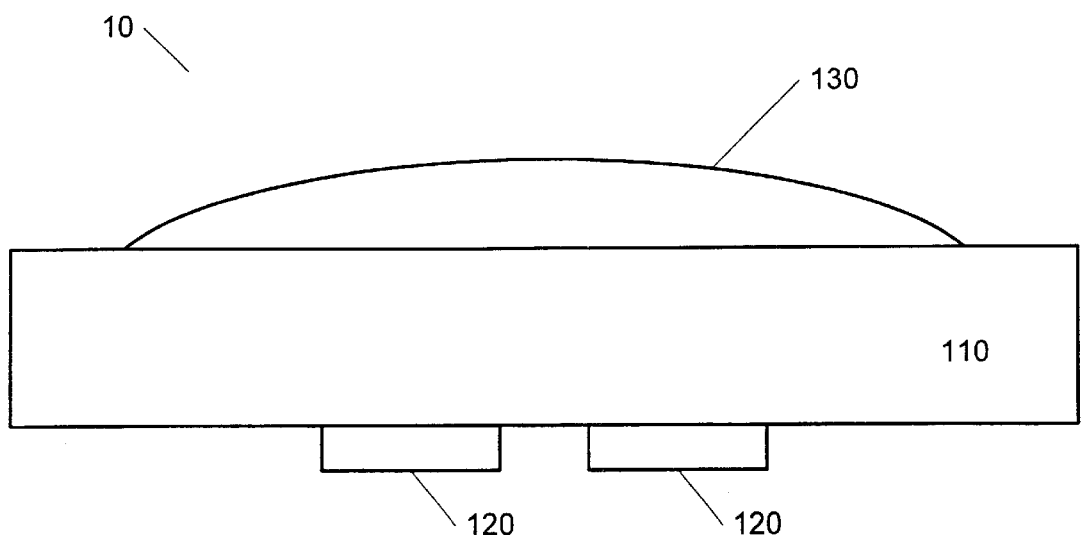
FIG. 1 illustrates an embodiment of the invention.

FIG. 1 provides a schematic embodiment of an integrated device 10 including an opto-electronic device and an optical micro-lens according to an embodiment of the invention. FIG. 1 is not intended to be drawn to scale. As shown in FIG. 1, the integrated device 10 comprises a substrate 110, one or more opto-electronic devices 120, and optical micro-lens 130. The substrate 110 may be a semiconductor substrate, such as silicon, a III-V semiconductor (e.g., GaAs), or a II-VI semiconductor, or a composite (e.g., ternary or quaternary) semiconductor. Alternatively, the substrate 110 may be an insulative substrate, such as silica. The substrate is preferably transmissive of light at wavelengths used during operation. In this regard, the substrate 110 may be formed of a transmissive material or a material having a bandgap greater than the energy of incident light of the desired transmission wavelengths. In one preferred embodiment, the transmission wavelengths include a band useful for optical communications. In general, these bands center around 1310 nm or 1550 nm. In this way, the integrated devices may be used in optical switching equipment (e.g., a microelectromechanical systems (MEMS) switch that uses micro-mirrors) for an optical communications network.

The opto-electronic device 120 may be a laser, an LED, or a photodetector, for example. As shown in FIG. 1, one or more opto-electronic devices 120 may be formed in or on the substrate 110. Of course, if a photodetector is used, the photodetector must be capable of absorbing some of the light passing through the substrate 110 for monitoring purposes. This can be achieved, for example, by appropriate selection of materials, configurations, and/or doping of the photodetector structure. In the embodiment of FIG. 1, a convex micro-lens 130 is formed on the side of the substrate opposite to the opto-electronic devices 120. It should be apparent that other arrangements may be employed consistent with the present invention. Micro-lens 130 may take other forms, such as a concave, Fresnel, or segmented. The micro-lens 130 may be formed in or on the substrate 110.

In the embodiment of FIG. 1, the convex micro-lens 130 has a focal length greater than the distance between the micro-lens 130 and the opto-electronic device 120 for the signal wavelength. The focal length is normally designed such that the signal light is focused on or near the facet of the collecting fiber (not shown). Accordingly, if the opto-electronic device 120 were a photodetector, some of the light passing through the microlens 130 may be absorbed by the photodetector while the rest of the light passes through the integrated device 10 and is focused to a point beyond the integrated device 10. Therefore, a beam-splitting function is achieved. The same result may be achieved if the micro-lens 130 and the opto-electronic device 120 (e.g., a photodetector) were formed on the same side of the substrate. In addition, if there is another incident light with shorter wavelength being used as the pilot or monitoring signal, the material of the photodetector can be chosen such that it absorbs this light without absorbing the signal light. Since the focal length of the same lens 130 will result in a shorter focal length for shorter wavelength, the detection efficiency of the photodetector for the pilot or monitoring signal will also be higher. In one scenario, one may design the lens and the signal and pilot/monitoring wavelengths such that the pilot/monitoring signal is focused on the photodetector, while the information signal is focused on the receiving fiber. The integrated device then functions as a photodetector, a dichroic beam-splitter, and a lens.

Figure 2A:
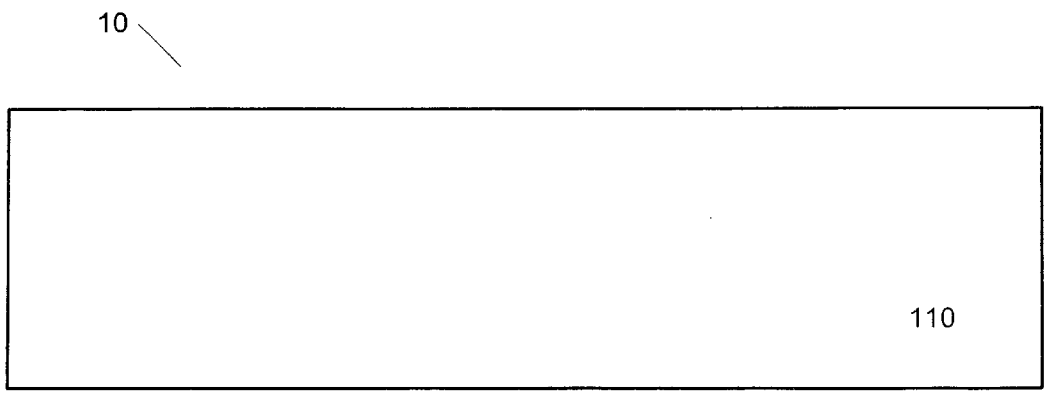
FIGS. 2A–2F illustrate a method for forming an embodiment of the invention.
Figure 2B:
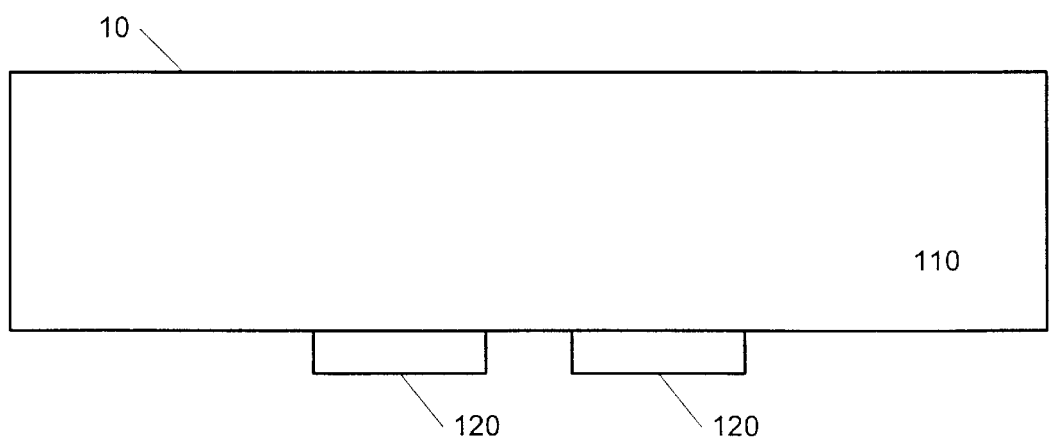
Figure 2C:
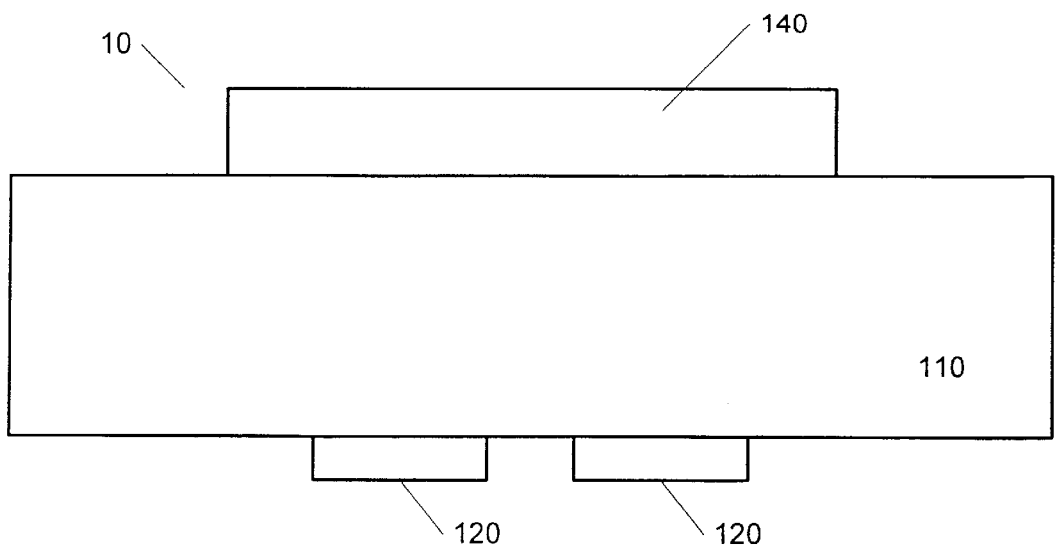
Figure 2D:
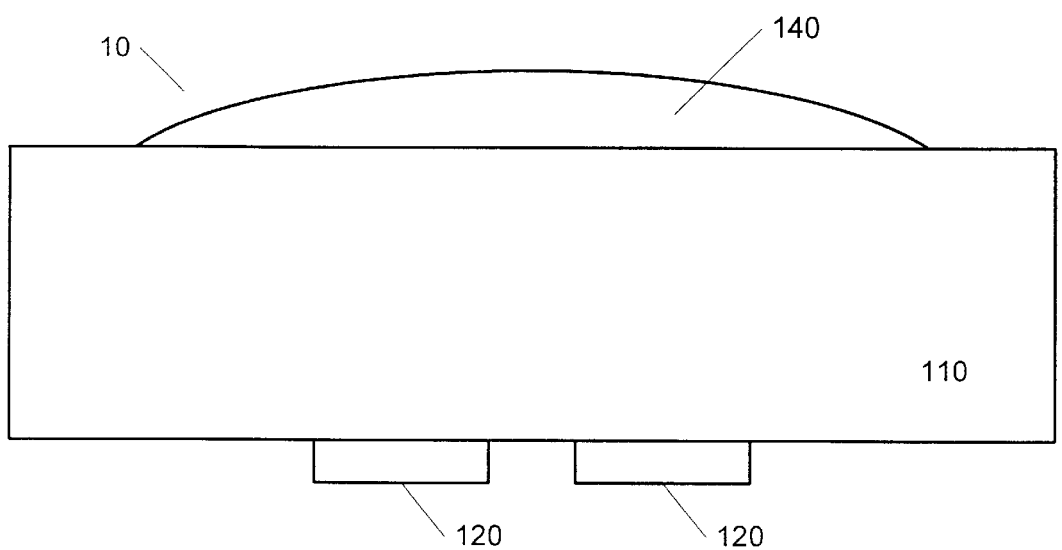

FIGS. 2A–2F illustrate a method for forming an integrated device 10 in accordance with an embodiment of the present invention. As shown in FIG. 2A, the process begins with the substrate 110. In FIG. 2B, one or more opto-electronic elements 120 are formed on the substrate 110 using conventional semiconductor processing steps. As shown in FIG. 2C, a masking material 140 is applied to a side of the substrate 110 opposite the opto-electronic elements 120 and patterned. The masking material 140 may be, for example, a photoresist or borophosphosilicate glass (BPSG). In FIG. 2D, the masking material 140 is heated to cause it to reflow to the desired shape to transfer the contours of the desired micro-lens to the substrate 110. Additional processing steps may be used to improve the shape of the masking material. The masking material 140 may also be formed in the desired lens-shape directly on the photoresist using a graded-index mask. In this case, reflow is not required.

Figure 2E:
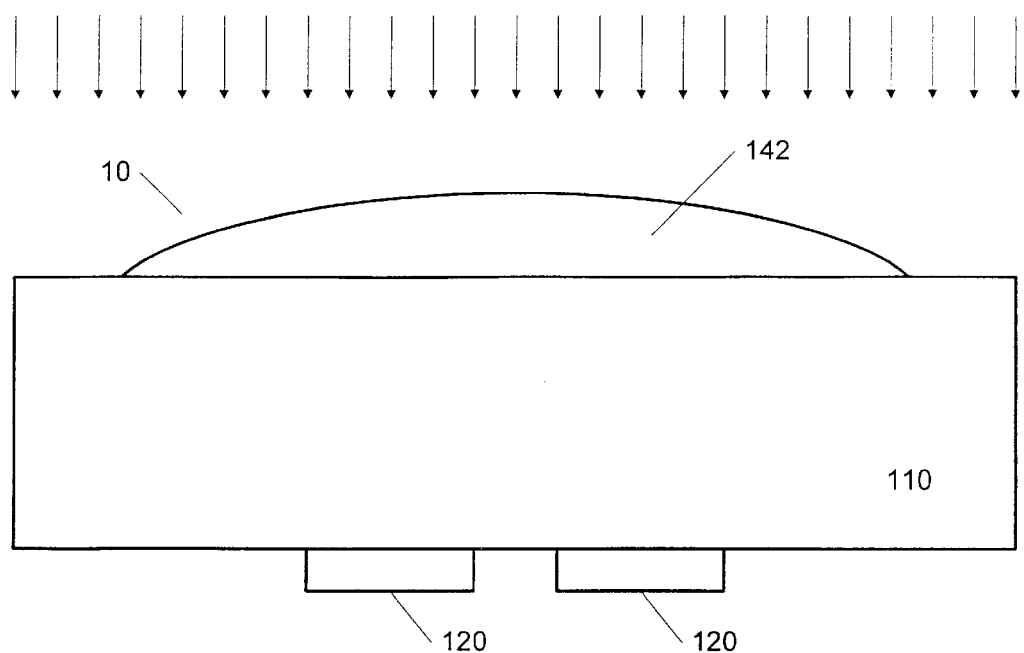
Figure 2F:
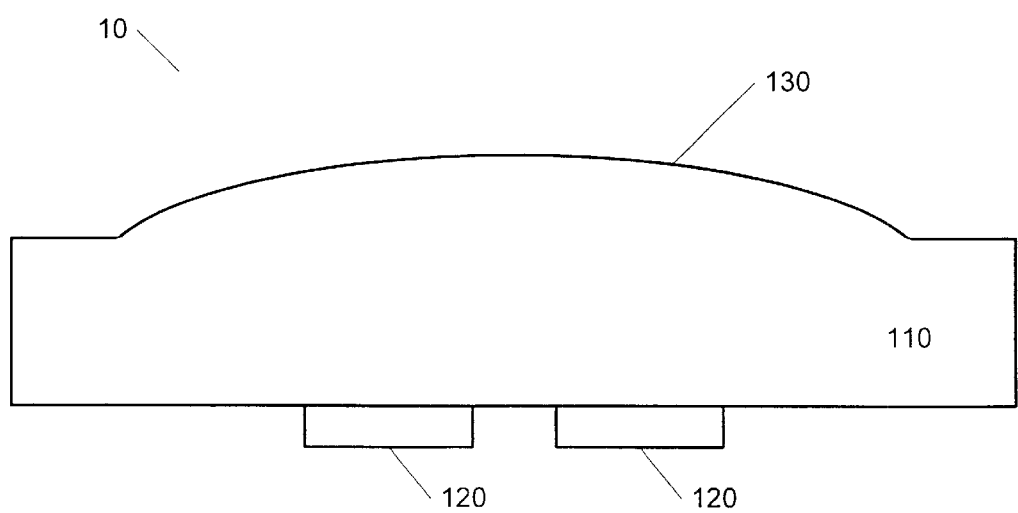

FIG. 2E shows the substrate 110 subjected to an etching process. The etching process is preferably a dry etching process, such as reactive ion etching (RIE) or a physical etch. Initially, the portions of the substrate 110 unprotected by the masking material are etched. As the etching process proceeds through the masking material 142, the desired shape of the micro-lens 130 is transferred to the substrate 110. Following the etching process, the surface of substrate 110 is shaped as the desired optical micro-lens. FIG. 2F shows the example of a convex optical lens. However, other lens shapes may be produced by appropriate patterning. When the opto-electronic device 120 includes a photodetector, the focal length of the micro-lens may be selected to allow partial absorption of light by the photodetector.

As described above, the opto-electronic devices 120 are formed in the substrate 110 before the micro-lens 130. However, this is not required. The processing steps for forming the opto-electronic device 120 may be before, during, or after the processing to form the micro-lens 130. Moreover, the micro-lens 130 and the opto-electronic devices 120 may be formed adjacent each other on the same side of the substrate 110.

Figure 3:
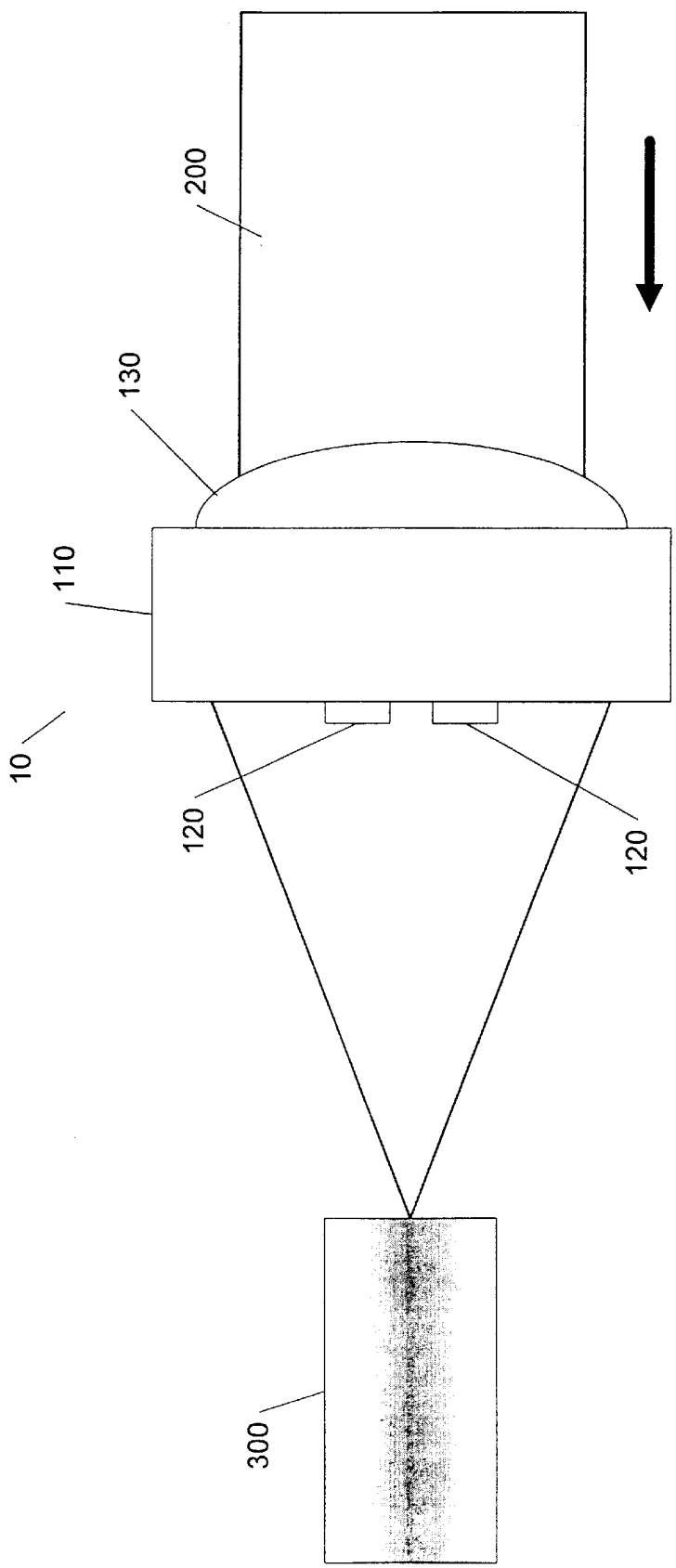
FIG. 3 illustrates the operation of an embodiment of the invention.

FIG. 3 illustrates one possible use of an integrated device 10 in accordance with the present invention. As shown in FIG. 3, the integrated device 10 includes photodetectors 120 arranged in a quad array. Of course, any one of various types of quad detector arrays or other types of detector arrangements may be used in connection with the present invention. The micro-lens 130 is shaped as a convex lens on a side of the substrate 110 opposite to the photodetectors 120. The focal length of the micro-lens 130 is shaped so as to allow partial absorption by the photodetectors 120 if the only light present is the information signal light and part of this light is used for monitoring. On the other hand, if additional pilot/monitoring light with a different wavelength is co-transmitted, the focal length can be designed so that the absorption efficiency of the photodetector is high for the pilot/monitoring light and low for the signal light. Incident light beam 200 is focused through the micro-lens 130, transmitting through the substrate 110, to the core of a receiving optical fiber 300. The incident light beam 200 need not be limited to light visible to humans, but may be light occupying another portion of the electromagnetic radiation spectrum, such as infrared or ultraviolet light. As noted above, in some embodiments, the incident light beam 200 may be of or within a wavelength band used for optical communications. In this way, the incident light beam 200 can be applied to the optical fiber 300 for transmission. In addition, a portion of the light impinging on the photodetectors 120 is absorbed and converted into an electrical signal. Accordingly, the integrated device 10 functions as a photodetector and an optical lens. Moreover, the integrated device 10 may be considered to perform a beam-splitting function in that the incident beam can be both focused to the receiving optical fiber 300 and detected by the photodetectors 120.

The integrated micro-lens/photodetector device 10 plan can then be easily aligned and packaged with fiber arrays. The device 10 can simultaneously achieve both optical beam position detection through the photodetectors and collimation through the micro-lens for optical switching applications, without resorting to bulk optics and elaborate alignment and packaging. For example, the micro-lens/photodetector device 10 can be used for optical-beam position detection in a micromirror-angular control in a high port count MEMS switch fabric that uses an analog beam-steering architecture. It can also be used to monitoring the signal quality. Such MEMS switch fabrics can be used for optical cross-connects with transparent optical cores.

It will be apparent to those skilled in the art that various modifications and variations can be made without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An integrated optical device comprising:

a light-transmissive substrate;

an opto-electronic device formed on the substrate; and a micro-lens formed on the substrate, wherein the opto-electronic device lies between the micro-lens and a focal plane of the micro-lens and allows light to focus at a point beyond the opto-electronic device.

2. An integrated optical device according to claim 1, wherein said opto-electronic device comprises a photodetector.

3. An integrated optical device according to claim 2, further comprising an array of photodetectors.

4. An integrated optical device according to claim 3, wherein said array of photodetectors are formed on a first side of said light-transmissive substrate and said micro-lens is formed on a second side of said light-transmissive substrate opposite the first side.

5. An integrated optical device according to claim 4, wherein the focal length of said micro-lens permits partial absorption by said photodetectors of light focused by said micro-lens.

6. An integrated optical device according to claim 1, wherein said micro-lens is a convex lens.

7. An integrated optical device according to claim 1, wherein said micro-lens is formed in said substrate.

8. An integrated optical device according to claim 1, wherein said micro-lens is formed on said substrate.

9. An integrated optical device according to claim 1, wherein said substrate is formed from an insulative material.

10. An integrated optical device according to claim 1, wherein said substrate is formed from a semiconductor material.

11. An optical device comprising:

an integrated optical device including a light transmissive substrate, a micro-lens formed on a first side of said substrate, and at least one photodetector formed on a second side of said substrate, the second side of the substrate being opposite the first side; and a receiving optical fiber, wherein said micro-lens focuses an incident light beam into a core of said receiving optical fiber such that a portion of the incident light beam is absorbed by said at least one photodetector.

12. An integrated optical device according to claim 11, wherein said at least one photodetector comprises an array of photodetectors.

13. An integrated optical device according to claim 11, wherein said micro-lens is a convex lens.

14. An integrated optical device according to claim 11, wherein said micro-lens is formed on said substrate.

15. An integrated optical device according to claim 11, wherein said substrate is formed from an insulative material.

16. An integrated optical device according to claim 11, wherein said substrate is formed from a semiconductor material.

17. An integrated optical device according to claim 11, wherein said incident light beam comprises an information signal at a first optical wavelength and a monitoring signal at a second optical wavelength, and wherein said at least one photodetector at least partially absorbs the monitoring signal without absorbing the information signal.

18. An integrated optical device according to claim 11, wherein said incident light beam comprises an information signal on a first optical wavelength, and wherein said micro lens focuses the information signal onto the core of said receiving optical fiber such that a portion is absorbed by said at least one photodetector.

19. A method for manufacturing an integrated optical device, comprising:

forming at least one opto-electronic device on a first side of a substrate; and forming a micro-lens on a second side of said substrate opposite the first side, wherein the opto-electronic device lies between the micro-lens and a focal plane of the micro-lens and allows light to focus at a point beyond the opto-electronic device.

20. A method according to claim 19, wherein said substrate is a light-transmissive substrate.

21. A method according to claim 20, wherein said step of forming at least one opto-electronic device comprises forming at least one photodetector.

22. A method according to claim 21, wherein said step of forming said micro-lens comprises forming said micro-lens having a focal length that permit partial absorption of light passing through said micro-lens by said at least one photodetector.

23. A method according to claim 21, wherein said step of forming said micro-lens comprises forming said micro-lens for directing a signal light beam at a first optical wavelength onto an optical fiber without absorption by said at least one photodetector and a monitoring light beam at a second optical wavelength for absorption by said at least one photodetector.

* * * * *